(12) United States Patent
Jeong

(10) Patent No.: US 6,778,721 B2
(45) Date of Patent: Aug. 17, 2004

(54) WDM SWITCH USING OADM AND CONTROL METHOD THEREOF

(75) Inventor: Kyu-Cheol Jeong, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 10/232,667

(22) Filed: Sep. 3, 2002

(65) Prior Publication Data

US 2003/0044110 A1 Mar. 6, 2003

(30) Foreign Application Priority Data

Sep. 4, 2001 (KR) ......................................... 2001-54204

(51) Int. Cl.[7] .............................. G02B 6/26; H04J 14/02
(52) U.S. Cl. .............................. 385/15; 385/16; 385/17; 385/24; 385/42; 385/31; 385/9; 385/10; 398/79; 398/82; 398/83; 398/48; 398/45
(58) Field of Search ............................ 385/15, 16, 17, 385/18, 14, 42, 40, 9, 10, 31, 24; 398/79, 82, 83, 48, 45

(56) References Cited

U.S. PATENT DOCUMENTS

| | | | | |
|---|---|---|---|---|
| 4,845,703 A | * | 7/1989 | Suzuki | ......................... 398/48 |
| 5,859,941 A | | 1/1999 | Horita et al. | ................. 385/37 |
| 6,069,719 A | * | 5/2000 | Mizrahi | ......................... 385/24 |
| 6,285,810 B1 | * | 9/2001 | Fincato et al. | ................. 385/24 |
| 6,459,516 B1 | * | 10/2002 | Mizrahi et al. | ................ 398/82 |
| 6,498,665 B1 | * | 12/2002 | Chauzat et al. | ................ 398/83 |
| 2002/0141009 A1 | * | 10/2002 | Yu et al. | ...................... 359/110 |
| 2003/0185565 A1 | * | 10/2003 | Wang et al. | .................. 398/49 |

* cited by examiner

Primary Examiner—Brian M. Healy
(74) Attorney, Agent, or Firm—Fleshner & Kim, LLP

(57) ABSTRACT

A wavelength division multiplexing (WDM) switching includes one or more optical add/drop multiplexers (OADMs) to drop or add optical signals on one or more optical channels. The OADM may be a 1-channel OADM which includes first and second conductors arranged periodically so as to have a pair of different polarities, an optical waveguide type coupler dropping or adding an optical signal of a specific channel by an electric field generated from the first and second conductors, a power supply unit supplying the second conductor with a power, and a switch placed between the second conductor and power supply unit to control a power supply of the second conductor, so as to control generation and termination of the electric field in accordance with an operation control signal. A method of controlling a 1-channel OADM in a WDM system includes checking whether a drop/add operation is demanded or not, forming an electric field at an optical waveguide type coupler if the drop/add operation is demanded, and carrying out the drop/add operation of a channel by the formed electric field.

26 Claims, 8 Drawing Sheets

WDM SWITCH USING OADM AND CONTROL METHOD THEREOF

BACKGROUND OF THE INVENTION

1. Field of the Invention

The present invention relates to a wavelength division multiplexing (WDM) system, and more particularly to a WDM switch which includes an optical add/drop multiplexer (OADM) and control method thereof.

2. Background of the Related Art

In an optical communication network, a wavelength division multiplexing (WDM) system transmits a plurality of optical signals simultaneously using various wavelengths. This enables the communication network to operate efficiently and at very high speed. Thus networks of this type are suitable for many broadband applications.

When an optical path having a specific wavelength is terminated at a specific node of an optical communication network employing a WDM system, the node should drop the wavelength. Moreover, if it is necessary to setup an optical path at the specific node using a new wavelength, the node uses a wavelength which will not bring about wave collision with signals transmitted on an optical path to another node. This is usually accomplished by having the node add the wavelength to other wavelengths which are passing by the specific node.

There are two kinds of mechanisms for adding/dropping a specific wavelength in a WDM system. The first mechanism operates based on the diffraction grating principle that diffraction/reflection varies in accordance with wavelength. The second mechanism operates by filtering a wavelength using a dichroic filter. At least one embodiment of the present invention includes an optical add/drop multiplexer (OADM) which operates in accordance with the first mechanism, for instance, an coupler-type OADM.

FIG. 1 is a diagram which illustrates a grating used in a coupler-type OADM according to a related art. In this circuit, when an UV (ultraviolet) beam is irradiated on a fusion-type coupler 10 including a photosensitive material through a phase mask, interference patterns are generated so that gratings 30 are formed in the coupler 10 by a photosensitive effect. Such a method of forming gratings in a coupler-type OADM can be applied to an optical waveguide-type coupler as well. As an alternative to the aforementioned technique, etching can be used to form the gratings in an optical waveguide-type coupler.

FIG. 2 is a diagram of a coupler-type OADM according to a related art. In this circuit, when optical signals are input into an input port 50 of an optical waveguide-type coupler 10, an optical signal having a specific wavelength is dropped from the input optical signals by a grating 45 formed at the optical waveguide type coupler 10 with a predetermined period so as to be outputted through a drop port 55. Moreover, when an optical signal having a specific wavelength is inputted to an add port 65 of the optical waveguide type coupler 40, the coupler type OADM according to the related art adds the optical signal having the specific wavelength to an optical signal passing the optical waveguide type coupler 40 by the grating 45, so as to output the added optical signals through an output port 60.

An output wavelength (drop wavelength) of the drop port 55 and an input wavelength (add wavelength) of the add port 65 in the coupler-type OADM are determined by the following Formula 1:

$$\lambda_1 = 2 n_{eff} \Lambda_1 \qquad [1]$$

where $\lambda_1$, $n_{eff}$, and $\Lambda_1$ indicate an input/output wavelength (drop/add wavelength), an effective refractive index, and a grating period respectively.

FIGS. 3(a)–(e) are graphs of optical signals having wavelengths dropped/added in a coupler-type OADM according to a related art. In these figures, an optical signal $\lambda_1$ (FIG. 3(b)), suitable for satisfying the condition of Formula 1 among optical signals $\lambda_1, \lambda_2 \lambda_3, \ldots, \lambda_n$ (FIG. 3(a)) input into an input port 50, is dropped so as to be output to a drop port 55. The rest of the optical signals (FIG. 3(c)) except optical signal $\lambda_1$ pass through an optical waveguide-type coupler 40. Once the optical signal $\lambda_1$ (FIG. 3(d)) having a wavelength suitable for satisfying the condition of Formula 1 is input into an add port 65, the input optical signal $\lambda_1$ (FIG. 3(d)) is added to an optical signal passing through the optical waveguide-type coupler so as to be output to an output port 60 (FIG. 3(e)).

One drawback of the related art is that the grating of the coupler-type OADM cannot be eliminated and still function as intended. Thus, if a function of dropping/adding an optical signal of a specific wavelength is unnecessary, additional manual work is required to remove the coupler-type OADM or the output of the drop port must be returned back to the input of the add port. Because manual work is required to modify or eliminate the coupler-type OADM, it is very difficult to operate this device by remote control. In addition, the coupler-type OADM fails to be flexible to network variation, and thus has poor adaptability when the structure of WDM network frequently varies due to rapid increases in the amount of data.

SUMMARY OF THE INVENTION

An object of the invention is provide a wavelength division multiplexing (WDM) system that substantially obviates one or more problems and/or disadvantages of the related art.

Another object of the present invention is to provide an OADM in a WDM system which freely forms/eliminates a grating of an optical waveguide-type coupler constituting the OADM.

Another object of the present invention is to provide an OADM in a WDM system which is suitable for being remotely controlled.

A further object of the present invention is to provide an OADM in a WDM system which drops/adds a plurality of channels simultaneously, by connecting a plurality of remotely controllable 1-channel OADMs in series.

Another object of the present invention is to provide a WDM switching system and method which connects different WDM networks by controlling a WDM switch which includes a multi-channel OADM.

These and other objects and advantages of the present invention are achieved by providing a WDM switching system which includes: a plurality of multi-channel OADMs connected in parallel and having drop and add ports which can be connected to cross with each other, and switching unit for switching a corresponding channel in accordance with an operation control signal for each channel, wherein each of the multi-channel OADMs has drop and add ports.

In another aspect of the present invention, a multi-channel OADM in a WDM system includes a plurality of 1-channel OADMs connected in series, each of the 1-channel OADMs dropping or adding different channels from an input WDM optical signal in accordance with operation control signals for the channels, respectively.

In a further aspect of the present invention, a 1-channel OADM in a WDM system includes first and second conductors arranged periodically so as to have a pair of different polarities, an optical waveguide-type coupler dropping or adding an optical signal of a specific channel by an electric field generated from the first and second conductors, a power supply unit supplying the second conductor with a power, and a switch placed between the second conductor and power supply unit to control a power supply of the second conductor, so as to control generation and termination of the electric field in accordance with an operation control signal.

In a further aspect of the present invention, a method of controlling a 1-channel OADM in a WDM system includes checking whether a drop/add operation is demanded or not, forming an electric field at an optical waveguide-type coupler if the drop/add operation is demanded, and carrying out the drop/add operation of a channel by the formed electric field.

In another aspect of the present invention, a method of controlling a multi-channel OADM in a WDM system includes checking channels to be dropped/added, outputting operation control signals for activating OADMs of channels to be dropped/added, activating the OADMs which receive the operation control signals for activation, and dropping or adding the corresponding channels by the activated OADMs.

In another aspect of the present invention, a method of controlling a WDM switch includes checking channels to be switched to a different WDM network, activating a first OADM dropping the channel to be switched and a second OADM adding the dropped channel, and adding the channel dropped from the second OADM if the corresponding channel is dropped from the first OADM so as to switch the corresponding channel to the different WDM network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
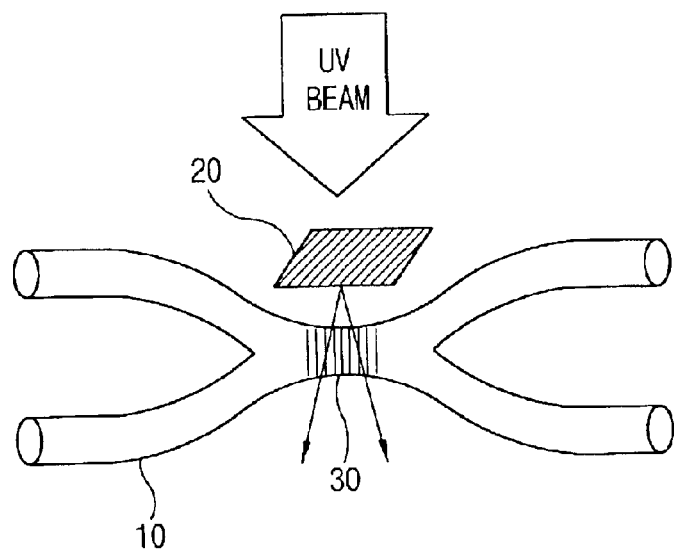
FIG. 1 is a diagram which shows a manner in which gratings are formed in a coupler-type OADM according to a related art.
Figure 2:
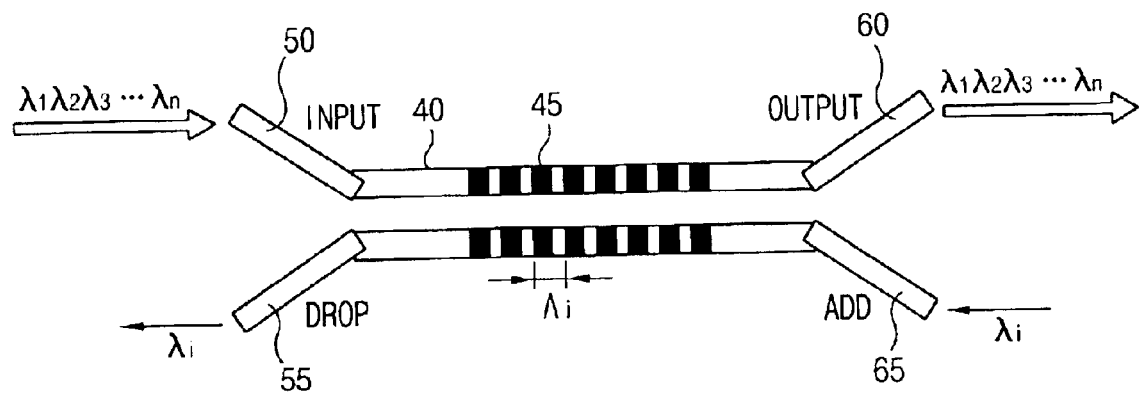
FIG. 2 is a diagram of a coupler-type OADM according to a related art.
Figure 3:
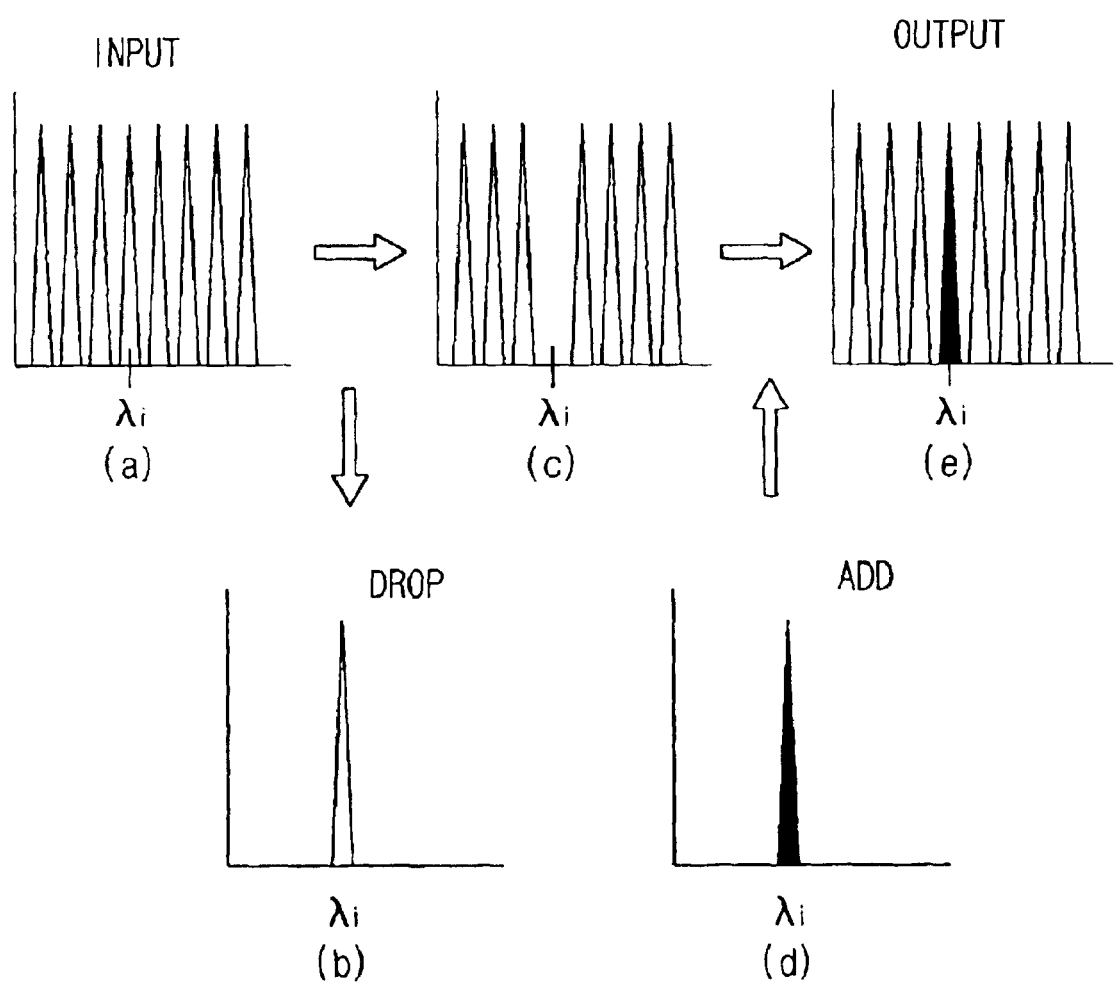
FIGS. 3(a)–(e) are graphs of optical signals having wavelengths dropped/added in a coupler-type OADM according to a related art.
Figure 4:
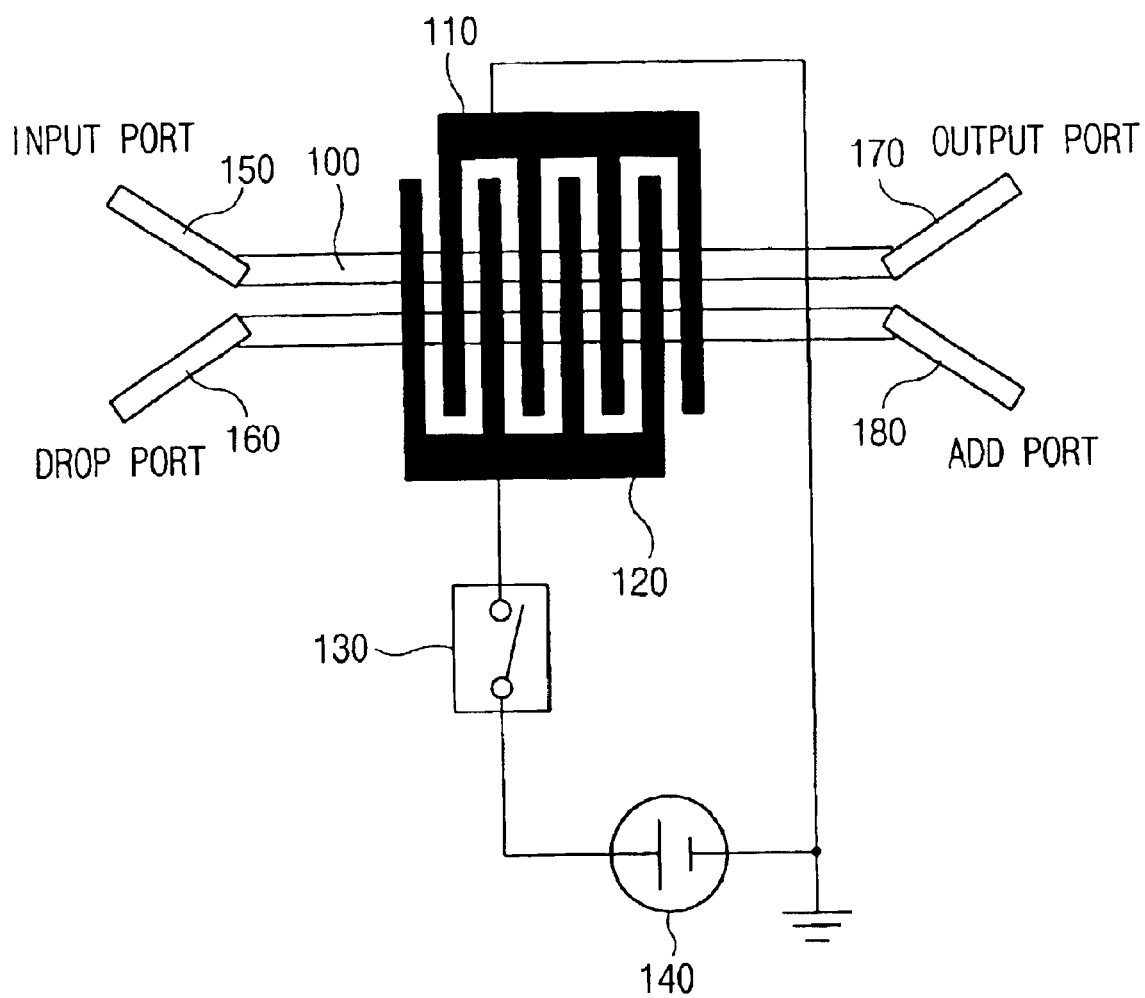
FIG. 4 is a diagram of a 1-channel OADM in a WDM system according to a first embodiment of the present invention.

FIG. 4 is a diagram of a 1-channel OADM according to a first embodiment of the present invention which, for example, maybe implemented in a WDM system. This OADM includes first and second conductors 110 and 120 arranged periodically so as to have a pair of different polarities, an optical waveguide-type coupler 100 for dropping (or adding) an optical signal of a specific wavelength (channel) by an electric field generated from the first and second conductors 110 and 120, a power supply unit 140 for supplying the second conductor 120 with a power, and a switch 130 placed between the second conductor 120 and power supply unit 140 for controlling the supply of power to the second conductor 120. The first conductor 110 is preferably grounded.

The optical waveguide-type coupler 100 is preferably formed of a material having an electro-optical effect such as $LiNbO_3$ and may, if desired, be doped with Ti. The optical waveguide-type coupler may also include an input port 150, a drop port 160, an output port 170, and an add port 180.

The 1-channel OADM of the WDM system can determine and thus effect a channel to be dropped (or added) by varying widths and intervals between the first and second conductors 110 and 120. Mote specifically, a drop wavelength (or add wavelength) may be changed using a method of varying the grating period Λ, in accordance with Formula 1.

Moreover, the 1-channel OADM of the WDM system can determine and thus effect the channel to dropped (or added) by changing voltage of the power supply unit 140. Specifically, an effective refractive index $n_{eff}$ of the optical waveguide-type coupler 100 may be varied in accordance with a variation of the electric field generated from the first and second conductors 110 and 120, thereby effecting a change the drop wavelength (or add wavelength).

In the present invention, operational explanation of changing the drop wavelength (or add wavelength) by varying the power of the power supply unit 140 is skipped. Instead, while the voltage is fixed to provide a maximum effective refractive index of the optical waveguide type coupler 100, the widths of the first and second conductors 110 and 120 and the interval between the first and second conductors 110 and 120 are adjusted so as to vary the drop wavelength (or add wavelength).

Figure 5:
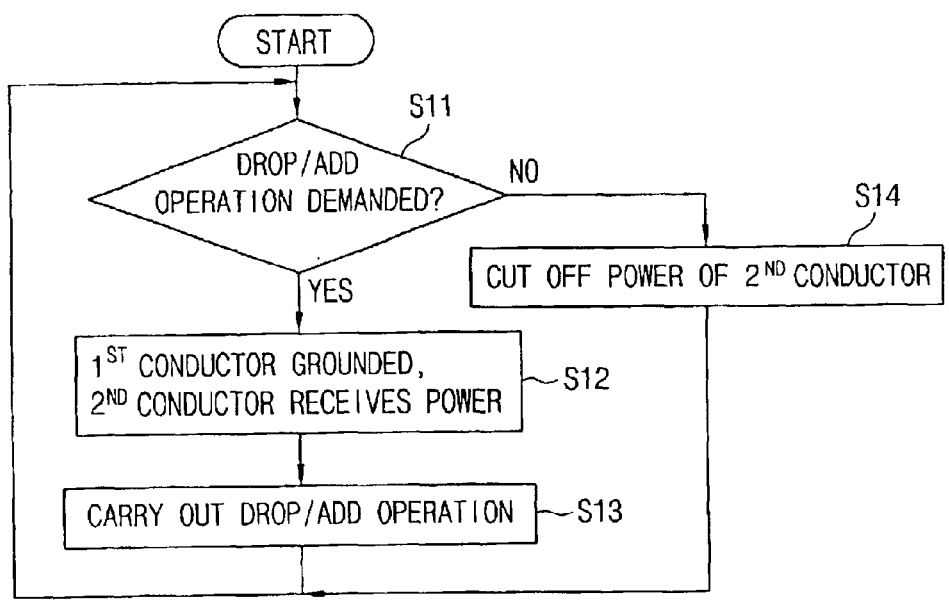
FIG. 5 is a flowchart showing steps included in a method of controlling a 1channel OADM in a WDM system according to a first embodiment of the present invention.
Figure 6:
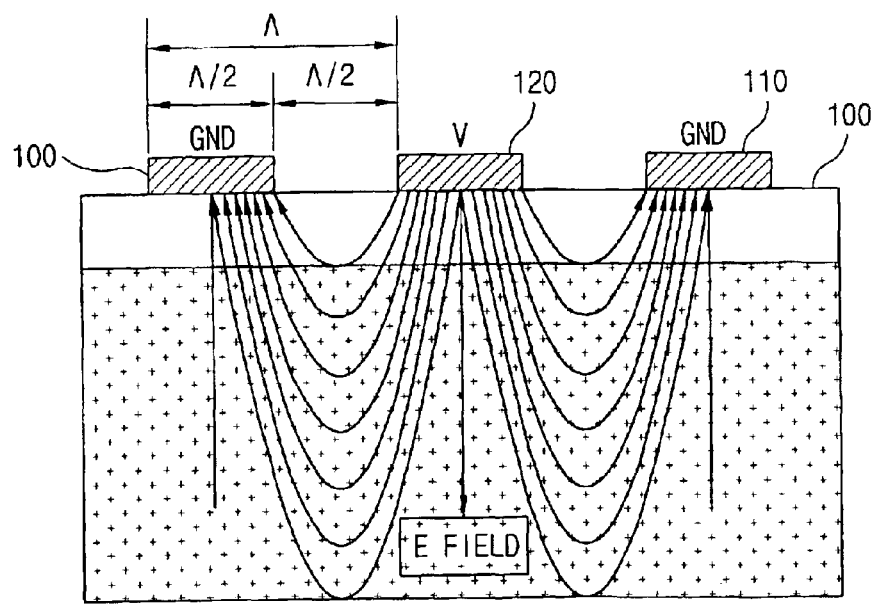
FIG. 6 is a diagram of an electric field formed at a waveguide-type coupler in a 1-channel OADM in a WDM system according to a first embodiment of the present invention.
Figure 7:
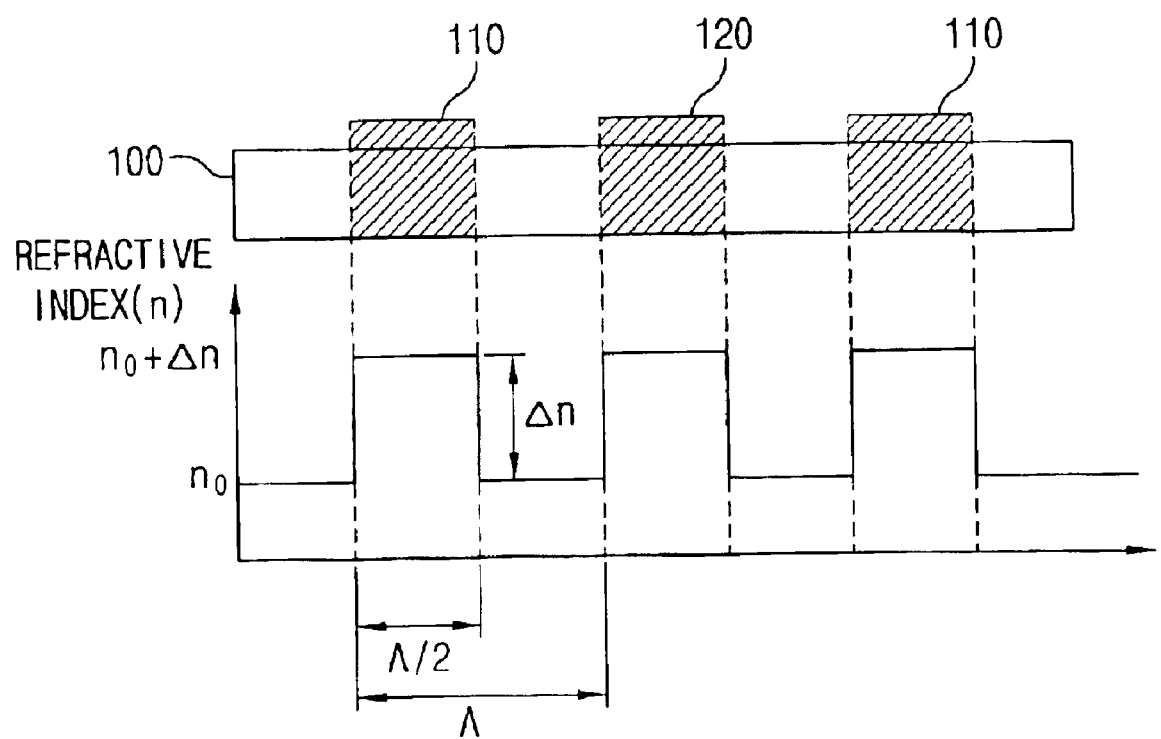
FIG. 7 is a diagram showing how a refractive index may be varied in accordance with an electric field formed in a 1-channel OADM in a WDM system according to a first embodiment of the present invention.

Operation of a 1-channel OADM in a WDM system according to a first embodiment of the present invention may be explained as follows. Specifically, FIG. 5 is a flowchart of a method of controlling a 1-channel OADM in a WDM system according to a first embodiment of the present invention. FIG. 6 is a diagram of an electric field formed at a waveguide-type coupler 100 in a 1-channel OADM in a WDM system according to a first embodiment of the present invention. And, FIG. 7 illustrates a diagram for a refractive index varying in accordance with an electric field formed in a 1-channel OADM in a WDM system according to a first embodiment of the present invention, where Δn indicates a variation amount of a refractive index.

In an initial step of the method, a channel for dropping (or adding) is determined in a 1-channel OADM. More specifically, in this step, a voltage of the power supply unit 140 is determined so as to maximize an effective refractive index of the optical waveguide type coupler 100. The widths and interval of the first and second conductors 110 and 120 should also be determined so as to drop (or add) a specific channel. For instance, as shown in FIG. 6, if an arrangement period (grating period) by the first and second conductors 110 and 120 is Λ, the widths of the first and second conductors 110 and 120 may be Λ/2, and also the interval between the first and second conductors 110 and 120 may be Λ/2 as well.

In a next step, the 1-channel OADM checks whether drop/add operation for 1-channel is demanded in a WDM network (S11). If the drop/add operation for the 1-channel is demanded, the switch 130 is controlled so as to apply the power to the second conductor 120(S12). It is a matter of course that a ground voltage is applied to the first conductor 110.

The optical waveguide type coupler 100, as shown in FIG. 6, then forms an electric field by the first and second conductors 110 and 120. Hence, the refractive index of the optical waveguide-type coupler 100, as shown in FIG. 7, is changed.

Next, in the 1-channel OADM the grating is formed at the optical waveguide type coupler 100 and the drop/add operation of the corresponding channel satisfying the condition of Formula 1 is carried out (S13).

If the drop/add operation of the channel is not demanded in the WDM network, the 1-channel OADM controls the switch 130 so as to cut off the power applied to the second conductor 120. Hence, the electric field is removed to bring about no change of the refractive index. As a result, no drop/add operation is carried out (S14).

The 1-channel OADM according to the first embodiment of the present invention controls the electric field formation by the conductors, which are arranged periodically in the optical waveguide-type coupler having the electro-optical effect, so as to have a pair of different polarities, thereby enabling the drop/add operation to be performed for the specific channel.

Figure 8:
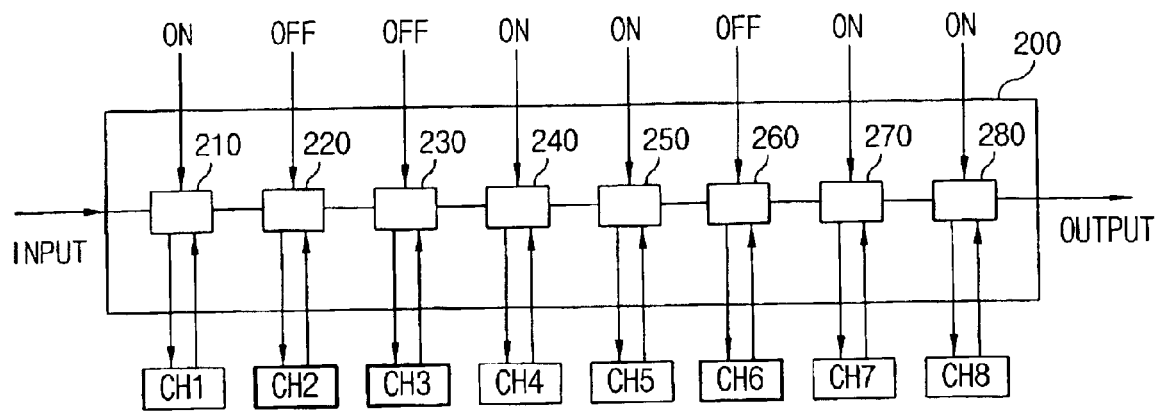
FIG. 8 is a block diagram of a multi-channel OADM in a WDM system according to a second embodiment of the present invention.

FIG. 8 is a block diagram of a multi-channel OADM in a WDM system according to a second embodiment of the present invention. This multi-channel OADM includes first through eighth OADMs 210 to 280 connected in series. The OADMs drop (or add) different wavelengths (channels) from (to) an input WDM optical signal in accordance with respective channel operation control signals.

Each of the first through eighth OADMs 210 to 280 preferably has the same constitution of the 1-channel OADM of the first embodiment of the present invention. However, in order to drop (or add) different channels, widths and intervals of the first to eighth OADMs 210 to 280 are set to be different from each other.

Figure 9:
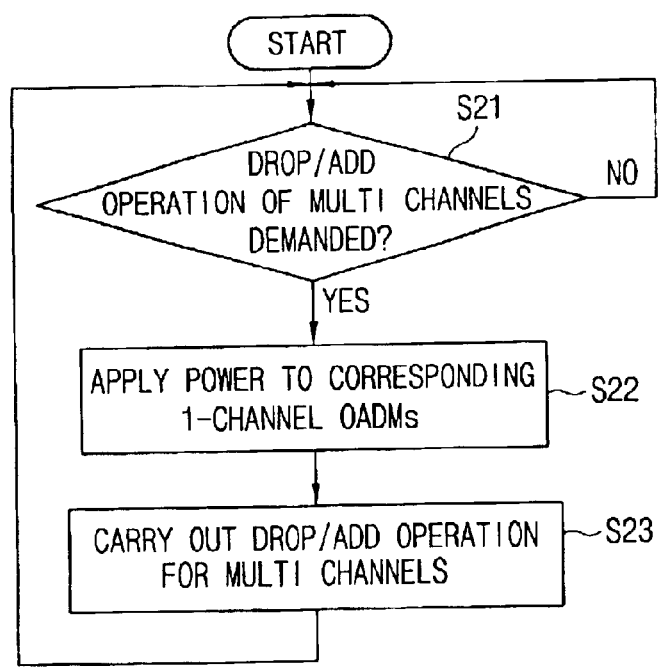
FIG. 9 is a flowchart showing steps included in a method of controlling a multi-channel OADM in a WDM system according to a second embodiment of the present invention.

Operation of the multi-channel OADM in the WDM system according to the second embodiment of the present invention is as follows. FIG. 9 is a flowchart of a method of controlling a multi-channel OADM in a WDM system according to a second embodiment of the present invention. In an initial step, a multi-channel OADM checks whether a drop/add operation for a plurality of channels is demanded in a ring type WDM network (S21).

If the drop/add operation for a plurality of the channels is demanded, for instance, as shown in FIG. 8, if the drop/add operation for the first, fourth, fifth, seventh, and eighth channels is demanded, the multi-channel OADM outputs an operation control signal for turning on the first, fourth, fifth, seventh, and eighths OADMs 210, 240, 250, 260, and 280 (S22).

The first, fourth, fifth, seventh, and eighths OADMs 210, 240, 250, 260, and 280 then drop (or add) the first, fourth, fifth, seventh, and eighth channels from (to) an input WDM optical signal (S23). Hence, the multi-channel OADM thus allows a plurality of channels to be dropped and/or added simultaneously.

In order to change a channel to be dropped (or added), the multi-channel OADM changes the operation control signal in order to carry out the drop/add operation for the corresponding changed channel. The multi-channel OADM then outputs the changed operation control signal to the corresponding 1-channel OADMs and the multi-channel OADM selects the channel on which the drop/add operation will be carried out based on the operation control signal.

Figure 10:
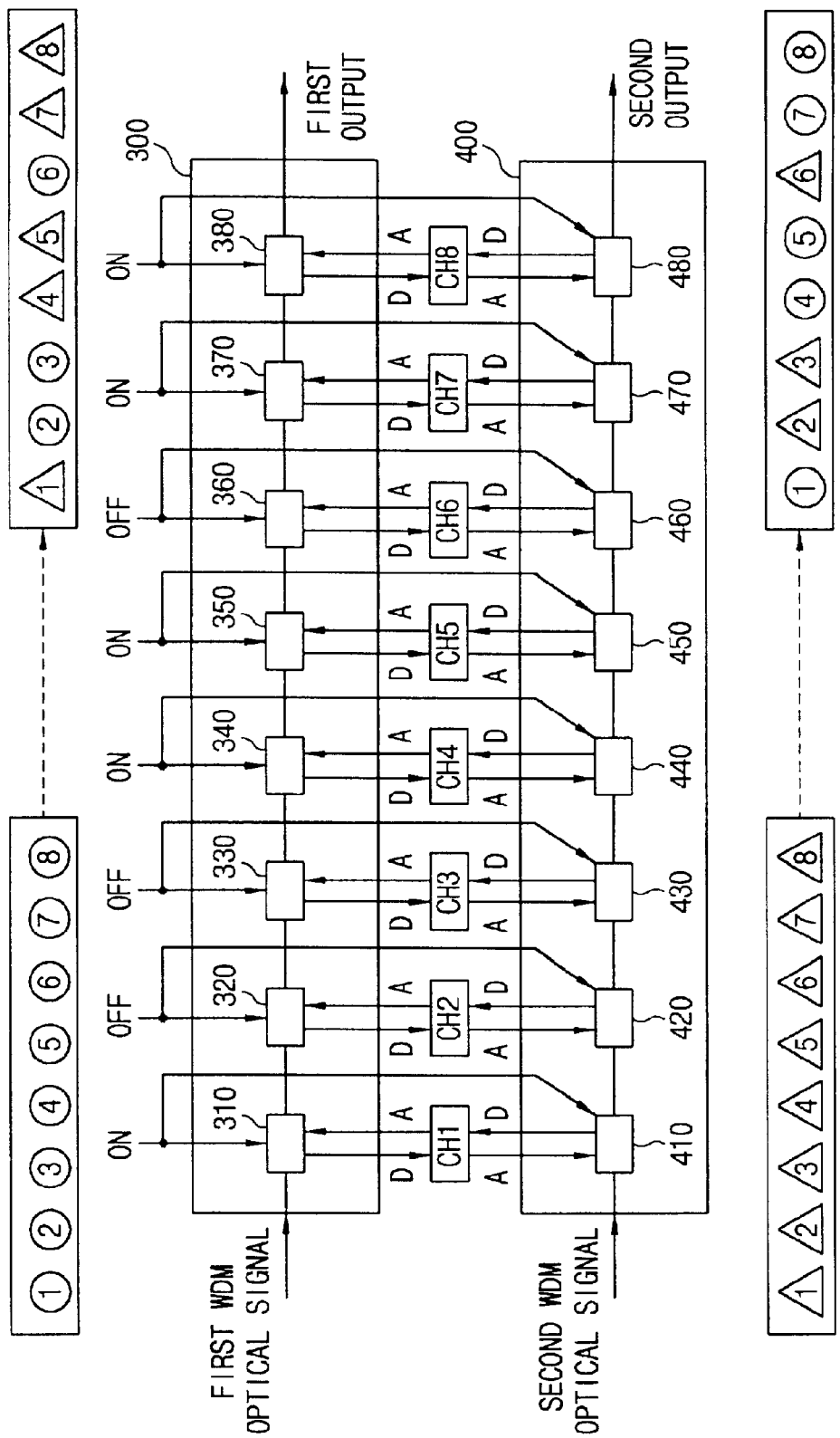
FIG. 10 is a block diagram of a WDM switch which uses an OADM according to a third embodiment of the present invention.

FIG. 10 is a block diagram of a WDM switch for a OADM according to a third embodiment of the present invention. This WDM switch includes first and second multi-channel OADMs 300 and 400 connected to each other in parallel, so that drop ports and add ports for each channel cross each other to be connected. Also, the first and second multi-channel OADMs 300 and 400 switch the corresponding channel in accordance with an operation control signal for each channel.

The first multi-channel OADM 300 includes first to eighth OADMs 310 to 380 connected in series, so as to drop a corresponding channel from a first WDM optical signal and add the corresponding drop channel output from the second multi-channel OADM 400 in accordance with an operation control signal for each channel.

Namely, the first multi-channel OADM 300 includes a first OADM 310 for dropping a first channel from a first WDM optical signal or adding the first channel in accordance with a first operation control signal; a second OADM 320 for dropping a second channel from an output optical signal of the first OADM 310 or adding the second channel in accordance with a second operation control signal; a third OADM 330 for dropping a third channel from an output optical signal of the second OADM 320 or adding the third channel in accordance with a third operation control signal; a fourth OADM 340 for dropping a fourth channel from an output optical signal of the third OADM 330 or adding the fourth channel in accordance with a fourth operation control signal; a fifth OADM 350 for dropping a fifth channel from an output optical signal of the fourth OADM 340 or adding the fifth channel in accordance with a fifth operation control signal; a sixth OADM 360 for dropping a sixth channel from an output optical signal of the fifth OADM 350 or adding the sixth channel in accordance with a sixth operation control signal; a seventh OADM 370 for dropping a seventh channel from an output optical signal of the sixth OADM 360 or adding the seventh channel in accordance with a seventh operation control signal; and an eighth OADM 380 for dropping an eighth channel from an output optical signal of the seventh OADM 370 or adding the eighth channel in accordance with an eighth operation control signal. Each of the first through eighth OADMs 310 to 380 is constituted with the 1-channel OADM according to the first embodiment of the present invention shown in FIG. 4.

The second multi-channel OADM 400 includes ninth to sixteenth OADMs 410 to 480 connected in series, so as to drop a corresponding channel from a second WDM optical signal and add a corresponding drop channel output from the first multi-channel OADM 300.

Namely, the second multi-channel OADM 400 includes a ninth OADM 410 for dropping the first channel from the second WDM optical signal or adding the first channel in accordance with the first operation control signal; a tenth OADM 420 for dropping the second channel from an output optical signal of the ninth OADM 410 or adding the second channel in accordance with the second operation control signal; an eleventh OADM 430 for dropping the third channel from an output optical signal of the tenth OADM 420 or adding the third channel in accordance with the third operation control signal; a twelfth OADM 440 for dropping the fourth channel from an output optical signal of the eleventh OADM 430 or adding the fourth channel in accordance with the fourth operation control signal; a thirteenth OADM 450 for dropping the fifth channel from an output optical signal of the twelfth OADM 440 or adding the fifth channel in accordance with the fifth operation control signal; a fourteenth OADM 460 for dropping the sixth channel from an output optical signal of the thirteenth OADM 450 or adding the sixth channel in accordance with the sixth operation control signal; a fifteenth OADM 470 for dropping the seventh channel from an output optical signal of the fourteenth OADM 460 or adding the seventh channel in accordance with the seventh operation control signal; and a sixteenth OADM 480 for dropping the eighth channel from an output optical signal of the fifteenth OADM 470 or adding the eighth channel in accordance with the eighth operation control signal. Each of the ninth to sixteenth OADMs 410 to 480 is constituted with the 1-channel OADM according to the first embodiment of the present invention shown in FIG. 4.

The number of inputs/outputs of the WDM switch may be determined in accordance with the number of the multi-channel OADMs connected in parallel with each other. An example of a 2×2 WDM switch is shown in FIG. 10.

Figure 11:
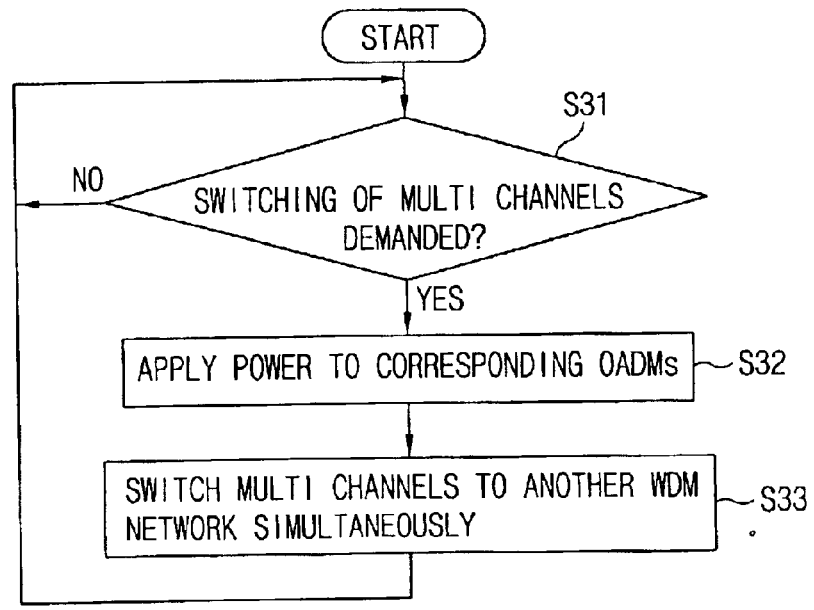
FIG. 11 is a flowchart showing steps included in a method of controlling a WDM switch using an OADM according to a third embodiment of the present invention.

Operation of the above-constituted WDM switch using OADM according to the third embodiment of the present invention is explained as follows. This operation is explained with reference to FIG. 11, which is a flowchart showing steps used to control a WDM switch using OADM according to a third embodiment of the present invention. For instance, as shown in FIG. 10, explained in the following is the case that each of the first and second WDM optical signals includes 8 channels.

In an initial step, a WDM switch checks whether a switching is demanded or not (S31). If the switching is demanded, the WDM switch activates an operation control signal corresponding to a channel that will be switched. For example, if the first, fourth, fifth, seventh, and eighth channels need to be switched, the WDM switch activates to output the first, fourth, fifth, seventh, and eighth operation control signals.

The drop/add operation of the first and ninth OADMs 310 and 410 is activated by the first operation control signal, the drop/add operation of the fourth and twelfth OADMs 340 and 440 is activated by the fourth operation control signal, and the drop/add operation of the fifth and thirteenth OADMs 350 and 450 is activated by the fifth operation control signal. Moreover, the drop/add operation of the seventh and fifteenth OADMs 370 and 470 is activated by the seventh operation control signal and the drop/add operation of the eighth and sixteenth OADMs 380 and 480 is activated by the eighth operation control signal (S32).

Hence, if the first WDM optical signal is inputted to the first multi-channel OADM 300, the first channel of the first WDM optical signal is switched by the drop operation of the first OADM 310 and the add operation of the ninth OADM 410. With the same method, the fourth, fifth, seventh, and eighth channels of the first WDM optical signal are switched.

If the second WDM optical signal is input into the second multi-channel OADM 400, the first channel of the second WDM optical signal is switched by the drop operation of the ninth OADM 410 and the add operation of the first OADM 310. With the same method, the fourth, fifth, seventh, and eighth channels of the second WDM optical signal are switched (S33).

Figure 12:
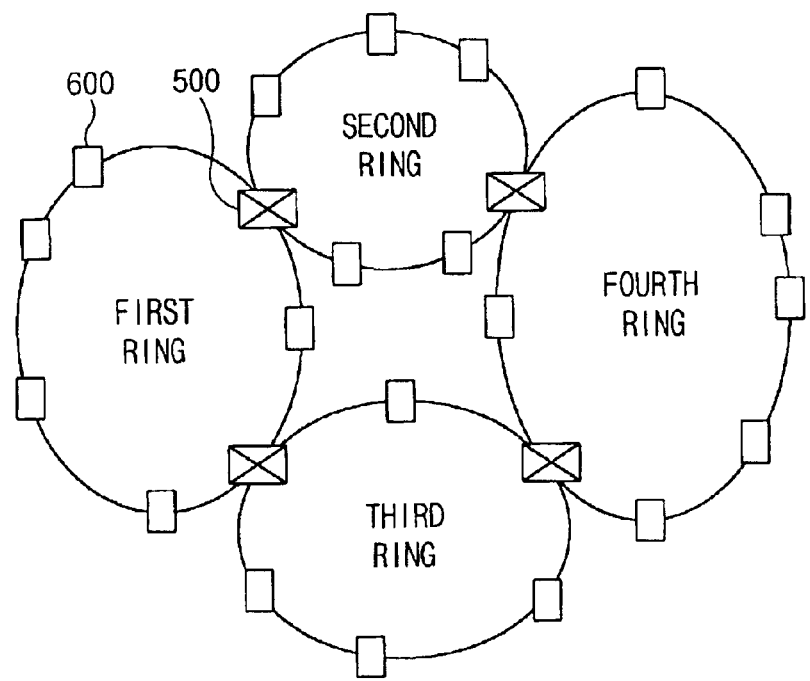
FIG. 12 is a diagram of WDM network to which the present invention is applied.

FIG. 12 is a diagram of WDM network to which the present invention may be applied. In this application, the present invention connects different ring-type WDM networks to each other using a WDM switch 500. This switch is advantageous because it allows a variety of network structures to be constructed. The present invention also connects a multi-channel OADM to each node 600 in the same WDM network. This allows optical signals having a plurality of wavelengths to be dropped/added simultaneously.

In summary, the present invention forms/eliminates the electric field of an optical waveguide-type coupler whose refractive index is varied by the electric field. This allows the invention to control ON/OFF of the drop/add operation of the channel as well as realize remote control.

The present invention also adjusts widths and intervals of the conductors arranged periodically so as to give a pair of different polarities to the optical waveguide-type coupler having the electro-optical effect. This enables the invention to select the channel that will be dropped/added. The present invention also changes a voltage difference between the conductors, thereby enabling selection of the channel that will be dropped/added.

The present invention also connects a plurality of 1-channel OADMs in series, thereby allowing a plurality of channels to be dropped and/or added simultaneously.

The present invention also changes the channels to be dropped/added using an operation control signal which turns 'ON/OFF' the drop/add operation for each channel.

The present invention constitutes the WDM switch using the multi-channel OADM, thereby allowing the channel to be switched to be changed freely.

The present invention also connects different WDM networks to each other using the WDM switch, thereby allowing a variety of network structures to be constructed.

The present invention also connects a multi-channel OADM to each node of the same WDM network, thereby providing a practical application of various wavelengths.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A WDM switch system, comprising:
   a plurality of multi-channel optical add/drop multiplexers (OADMs) connected in parallel, said OADMs having drop and add ports connected to cross with each other, and
   a switching unit for switching a number of channels in accordance with an operation control signal for each of the channels, wherein each of the multi-channel OADMs has drop and add ports, and wherein each OADM drops and adds optical signals by applying an electric field that produces an electro-optical (E/O) effect.

2. The WDM switch of claim 1, further comprising:
   a number of inputs/outputs determined in accordance with a number of the multi-channel OADMs.

3. The WDM switch of claim 1, wherein the multi-channel OADMs comprise a plurality of 1-channel OADMs connected in series, each of the 1-channel OADMs dropping a corresponding channel signal from an input WDM optical signal, and adding the corresponding channel signal dropped by another multi-channel OADM in accordance with the operation control signal for each channel.

4. The WDM switch of claim 3, wherein each of the 1-channel OADMs comprises:
   first and second conductors arranged periodically so as to have a pair of different polarities;
   an optical waveguide-type coupler dropping or adding an optical signal of a specific channel by the electric field, which is generated from the first and second conductors;
   a power supply unit supplying the second conductor with a power; and
   a switch, located between the second conductor and power supply unit, to control the power supply of the second conductor, so as to control generation and termination of the electric field in accordance with the operation control signal.

5. The WDM switch of claim 4, wherein widths and interval of the first and second conductors are adjusted so as to change the channel to be dropped/added.

6. The WDM switch of claim 4, wherein a voltage of the power supply applied to the second conductor is adjusted in order to change the channel to be dropped/added.

7. The WDM switch of claim 4, wherein the optical waveguide-type coupler is formed from a material within which the electro-optical effect occurs, such that a refractive index is changed by the electric field.

8. A multi-channel optical add/drop multiplexer (OADM) in a WDM system, comprising:
   a plurality of 1-channel OADMs connected in series, each of the 1-channel OADMs dropping or adding different channel signals from an input WDM optical signal in accordance with operation control signals for the channels, respectively, wherein each OADM drops or adds a channel signal by applying an electric field which produces an electro-optical (E/O) effect.

9. The multi-channel OADM of claim 8, wherein the operation control signals are activated/deactivated for the corresponding channels so as to select a plurality of the channel signals to be dropped/added.

10. The multi-channel OADM of claim 8, wherein each of the 1-channel OADM comprises:
    first and second conductors arranged periodically so as to have a pair of different polarities;
    an optical waveguide-type coupler dropping or adding an optical signal of a specific channel by the electric field, which is generated from the first and second conductors;
    a power supply unit supplying the second conductor with a power; and
    a switch, located between the second conductor and power supply unit, to control a power supply of the second conductor, so as to control generation and termination of the electric field in accordance with the operation control signal.

11. The multi-channel OADM of claim 10, wherein widths and interval of the first and second conductors are adjusted so as to change the channel to be dropped/added.

12. The multi-channel OADM of claim 10, wherein a voltage of the power supply applied to the second conductor is adjusted so as to change the channel to be dropped/added.

13. The multi-channel OADM of claim 10, wherein the optical waveguide-type coupler is formed using a material which demonstrates the electro-optical effect which causes a refractive index to change when by the electric field is applied.

14. A 1-channel OADM in a WDM system, comprising:
    first and second conductors arranged periodically so as to have a pair of different polarities;
    an optical waveguide-type coupler dropping or adding an optical signal of a specific channel by an electric field generated from the first and second conductors;
    a power supply unit supplying the second conductor with a power; and
    a switch, located between the second conductor and power supply unit, to control a power supply of the second conductor so as to control generation and termination of the electric field in accordance with an operation control signal.

15. The 1-channel OADM of claim 14, wherein the first conductor is grounded.

16. The 1-channel OADM of claim 14, wherein widths and interval of the first and second conductors are adjusted so as to change the channel to be dropped/added.

17. The 1-channel OADM of claim 14, wherein a voltage of the power supply applied to the second conductor is adjusted so as to change a channel to be dropped/added.

18. The 1-channel OADM of claim 14, wherein the optical waveguide type coupler is formed using a material which demonstrates an electro-optical effect which causes a refractive index to change when the electric field is applied.

19. A method of controlling a 1-channel optical add/drop multiplexer (OADM) in a WDM system, comprising:
    checking whether a drop/add operation is demanded or not;
    forming an electric field at an optical waveguide-type coupler if the drop/add operation is demanded; and
    carrying out the drop/add operation of a channel by the formed electric field.

20. The method of claim 19, wherein the step of forming the electric field at the optical waveguide type coupler is carried out by applying a ground voltage to one of conductors arranged periodically at the optical waveguide type coupler so as to have different polarities from each other, and applying a power supply voltage to the other conductor.

21. The method of claim 19, wherein the electric field formed at the optical waveguide-type coupler is terminated if the drop/add operation is not demanded.

22. A method of controlling a multi-channel optical add/drop multiplexer (OADM) in a WDM system, comprising:

checking channels to be dropped or added;

outputting operation control signals for activation to OADMs of the channels to be dropped or added, respectively; and activating the OADMs to drop or add optical signals of the corresponding channels based on the operation control signals, wherein, when activated, each of the OADMs applies an electric field to a corresponding optical waveguide-type coupler to add or drop an optical signal to or from a corresponding one of the channels.

23. The method of claim 22, wherein the electric field applied by each of the OADMs changes a refractive index of a corresponding optical waveguide-type coupler.

24. A method of controlling a WDM switch, comprising:

checking channels to be switched to a different WDM network;

activating a first OADM to drop an optical signal from the channel to be switched and a second OADM to add the optical signal from the dropped channel, wherein when the first and second OADMs are activated, electric fields are applied to respective optical waveguide-type couplers which carry the optical signals; and adding the channel dropped from the second OADM if the corresponding channel is dropped from the first OADM, so as to switch the corresponding channel to the different WDM network.

25. The WDM switch of claim 1, wherein each OADM receives a separate wavelength division multiplexing (WDM) optical signal.

26. The WDM switch of claim 1, wherein each OADM outputs a separate wavelength division multiplexing (WDM) optical signal.

* * * * *